2,899,327
Patented Aug. 11, 1959

2,899,327
GLUE SETTING ACCELERATORS

Edward F. Christopher, Chicago, and Harland H. Young, Western Springs, Ill., assignors to Swift & Company, Chicago, Ill., a corporation of Illinois No Drawing. Application December 5, 1955
Serial No. 550,813

10 Claims. (Cl. 106—125)

This invention relates to the manufacture of new and useful animal protein products derived from collagen, and more particularly to animal glue and gelatin compositions which set to produce a tough, non-tacky film.

This is a continuation-in-part of our abandoned copending application Serial No. 265,208, filed January 5, 1952.

Animal glue and gelatin products which form tough, non-tacky films set by virtue of their tendency to lose moisture and their tendency to congeal to a gel. The rate at which a glue or gelatin product sets to a non-tacky film is generally indicated by the standard Bloom jelly test which records the weight in grams required to press a piston into a gel a given distance under standard conditions. Normally, the higher the gel strength (Bloom test) the faster will the product set. It is also recognized that an animal glue or gelatin product that has a high rate of set will have certain of the desirable properties associated with a product having a high gel strength. Thus, an animal glue or gelatin product which has a high rate of set generally has a greater commercial value than the slower setting products.

In the manufacture of certain animal glue products commonly designated as "flexible glues," varying amounts of plasticizers are often added to the glue composition where the animal glue product is subjected to dehydration and desiccation. Plasticizers that are suitable for such purposes are glycerine, sorbitol, glycols, sugars, and other polyhydric humectants which are compatable with animal glue. Thus, by increasing the amount of plasticizers, the animal glue may be converted from a brittle horny substance to a soft, pliable, rubber-like product which is known commercially as flexible glue. Intermediate amounts of plasticizers produce a very tough, leathery film.

In the manufacture of other animal glue products which are not classed as flexible glues, the rate of set of the glue products is frequently much slower than desired, as when the slower setting bone glues are used in substantial amounts. Thus, since there are many applications in which it is highly desirable that the animal glue products set to a tough film more rapidly than normally, the usefulness and value of animal glue and gelatin products which set to a tough, non-tacky film could be greatly increased by decreasing the time required for the films to set to a gelled, tough, non-tacky film.

Therefore, it is an object of the present invention to provide animal glue and gelatin compositions with a substantially increased rate of set.

It is also an object of the present invention to provide animal glue and gelatin compositions of a given gel strength having a substantially increased rate of set without substantially increasing its gel strength.

Another object of the invention is to provide animal glue and gelatin compositions which form a tough, leathery film with an increased rate of set.

Still another object of the invention is to provide a flexible animal glue composition having an increased melting point and an increased rate of set without substantially increasing the gel strength thereof.

Other objects of the invention will be apparent from the detailed description and claims to follow:

Broadly, the invention contemplates the addition to an animal protein derived from collagen, a quantity of a substituted ammonium salt of a water soluble polycarboxylic acid whose acid portion of the salt is characterized by an additional function selected from the groups consisting of alcohols and ethers. Examples of such compounds are the substituted ammonium salts of such hydroxy polycarboxylic acids as tartronic, malic, citramalic, hydroxy glutaric, tartaric, citric, trihydroxy glutaric, mannosaccharic, saccharic, and mucic, and the substituted ammonium salts of a water soluble polycarboxylic acid which contains an ether function in the acid portion of the salt such as, for example, diglycolic and ethylene bis glycolic.

The most effective substances within the foregoing broad class of substances for increasing the rate of set or melting point of animal glue compositions are the hydroxy alkylamine salts of tartaric, citric, and malic acids. Of the many hydroxy alkyl amines which are suitable we find mono, di, and triethanolamines, mono, di, and triisopropanolamines and mixtures thereof are most readily available and suitable for the nitrogen-containing base.

It has been found, for example, that mono, di, or triethanolamine citrate or mixtures thereof will reduce the setting time of a conventional glue or gelatin composition to about from one-half to one-eighth of the time required by the same glue or gelatin without the alkylolamine salt. At levels of from about 1 to 10 percent, based upon the weight of animal glue preparation, the alkylolamine citrates, tartrates, malates, etc., will greatly enhance the rate of set of a flexible glue, dry glue in solution, and films of liquid glue. In addition, the dried film is much more tough and leathery in appearance and behavior.

In flexible glue compositions where higher degrees of plasticization are desired, the amounts of the plasticizing materials may vary from 5 percent to 75 percent of the total composition and from 10 percent to 150 percent of the dry glue weight.

The following specific examples illustrate the present invention in several of its forms but should not be construed to limit the invention to the precise compositions or proportions disclosed:

Example I

| | Percent |
|---|---|
| Bone glue (75 gm. Bloom test) | 90 |
| Triethanolamine citrate | 10 |

The above composition was prepared by adding the triethanolamine citrate to a concentrate solution (45%) of the bone glue. After mixing thoroughly, the heavy solution was chilled to strips of jelly and dried by passing first cold and finally warm air over the strips. The dried glue was a tough, leathery flake material which, when reconstituted to approximately a 40 percent solution, set in about one-half of the time required by the original glue.

Example II

| | Percent |
|---|---|
| Hide glue (200 gm. Bloom test) | 93 |
| Diethanolamine tartrate | 7 |

This composition was prepared as in Example I. When reconstituted to a 30 percent solution it set in about one-third the time required by the original glue.

Example III

| | Percent |
|---|---|
| Hide glue (250 gm. Bloom test) | 35 |
| Water | 35 |
| Glycerine | 14 |
| Sorbitol | 8 |
| Pentachlorophenol sodium salt | 0.5 |
| Capryl alcohol | 0.5 |
| Lithopone | 2.0 |
| Diethanolamine citrate | 5.0 |

The foregoing flexible glue composition was prepared by dissolving the glue in the water and adding the remaining ingredients to the glue solution. The temperature of the composition was maintained between about 140° F. and 160° G. with agitation until a uniform mixture of the several ingredients was obtained. The mass was then poured into molds and allowed to cool to form flexible slabs which could be readily remelted.

The resulting flexible glue composition had a high rate of set and produced a film having a firm body when set. After dilution to a useful consistency, the setting time for the foregoing flexible glue composition was found to be 1.5 minutes as compared with a setting time of 8 minutes for the control flexible glue at the same dilution, having the same composition except for the omission of the diethanolamine citrate and its replacement with glycerine.

Example IV

| | Percent |
|---|---|
| Bone glue (Bloom jelly strength 75 gm.) | 24 |
| Hide glue (Bloom jelly strength 250 gm.) | 12 |
| Water | 30 |
| Invert sugar | 5 |
| Glucose | 19 |
| Sugar, brown | 5 |
| Capryl alcohol | 1.5 |
| Pentachlorophenol | 0.5 |
| Triethanolamine citrate | 3 |

A concentrated solution of the glue was prepared by dissolving the glue components in the water heated to a temperature between 140° F. to 160° F. and then adding the remaining ingredients with agitation until a uniform mixture was obtained. The mass was poured into molds and allowed to cool.

Upon remelting the above flexible glue composition and dilution to a usable consistency, it was found to have a setting time of 3.5 minutes as compared with a setting time of 10 minutes for the control sample of flexible glue.

Example V

| | Percent |
|---|---|
| Hide glue (Bloom jelly strength 250 gm.) | 18 |
| Water | 25 |
| Sugar | 28 |
| Invert sugar | 5 |
| Glucose | 20 |
| Octadecanol | 1.5 |
| Sodium propionate | 0.5 |
| Di-isopropanolamine citrate | 5 |

The foregoing ingredients were combined to form a flexible glue composition as in Example II.

Upon remelting and diluting to a usable consistency, the flexible glue composition was found to have a setting time of three minutes as compared with a setting time of 12 minutes for the control sample of flexible glue.

Example VI

| | Percent |
|---|---|
| Hide glue (250 gm. test) | 35 |
| Water | 35 |
| Glycerine | 14 |
| Sorbitol | 8 |
| Sodium propionate | .5 |
| Octadecanol | .5 |
| Lithopone | 2.0 |
| Diethanolamine tartrate | 5.0 |

The foregoing ingredients were combined as in the preceding examples to form a flexible glue composition.

Upon remelting the glue composition and dilution to a usable consistency, it was found to have a setting time of 1.5 minutes as compared with a setting time of 8 minutes for the control sample.

Example VII

| | Parts |
|---|---|
| Gelatin | 1 |
| Glycerine | 7 |
| Diethanolamine citrate | ½ |
| Water | 3 |

Gelatin is soaked in a cold mixture of water and glycerine. When swollen, the gel is melted until uniform and the diethanolamine citrate is stirred in thoroughly. When cast into a film on a flexible backing, the above mixture sets with extreme rapidity and is useful as a duplicator film or roll (hectograph).

Example VIII

| | Percent |
|---|---|
| Bone glue (75 gm. Bloom test) | 90 |
| Diethanolamine diglycollate | 10 |

This composition was prepared as described in Example I. When the dry glue composition was reconstituted to approximately 40% solution it set in about two-thirds of the time required for the original glue.

Example IX

| | Percent |
|---|---|
| Bone glue (75 gm. Bloom test) | 24 |
| Hide glue (250 gm. Bloom test) | 12 |
| Water | 30 |
| Invert sugar | 5 |
| Glucose | 19 |
| Sugar, brown | 5 |
| Capryl alcohol | 1.5 |
| Pentachlorophenol | 0.5 |
| Diethanolamine ethylene bis glycollate | 3 |

This composition was prepared as described in Example IV and upon being tested after dilution to useful consistency, it was found to have a setting time of about one-half of the setting time for the control sample of flexible glue.

Example X

| | Percent |
|---|---|
| Hide glue (260 gm. Bloom test) | 35 |
| Water | 35 |
| Glycerin | 14 |
| Sorbitol | 8 |
| Sodium propionate | .5 |
| Octadecanol | .5 |
| Lithopone | 2.0 |
| Diethanolamine diglycollate | 5.0 |

The several ingredients were combined as described in Example IV. The glue composition was remelted and diluted to a usuable consistency. It was found to have a setting time of 5 minutes as compared with the setting time of 9 minutes for the control sample.

Example XI

| | Percent |
|---|---|
| Water | 40 |
| Glycerin | 30 |
| Hide glue (250 gm. Bloom test) | 30 |

The above formula is that of the control glue. Varying amounts of 2%, 3% and 6% diethanolamine diglycollate were incorporated in portions of the foregoing composition. The three test glues were prepared by adding the diethanolamine diglycollate to a solution of the glue composition with agitation while holding the temperature of the glue composition at 150° F. until a uniform mixture was obtained. The effect of adding varying amounts of the diethanolamine diglycollate salt to the glue composition is set forth in the following table:

|  | Setting Time in Minutes at relative Humidities of— | |
|---|---|---|
|  | 25% | 50% |
| Control Glue | 5.0 | 9.0 |
| Control Glue plus 2% Diethanolamine Salt | 4.0 | 8.0 |
| Control Glue plus 3% Diethanolamine Salt | 3.5 | 7.0 |
| Control Glue plus 6% Diethanolamine Salt | 2.5 | 5.0 |

*Example XII*

| | Percent |
|---|---|
| Hide glue (250 gm. Bloom test) | 30 |
| Water | 40 |
| Glycerin | 30 |

A concentrated solution of the glue composition was prepared by dissolving the glue component in the water heated to a temperature of 150° F. and then adding the glycerin with agitation until a uniform mixture was obtained.

A second glue composition of the following formula was prepared in a similar fashion:

| | Percent |
|---|---|
| Hide glue (250 gm. Bloom test) | 30 |
| Water | 40 |
| Triisopropanolamine ethylene bis diglycollate | 30 |

It will be noted that the test glue composition differed from the control in that the triisopropanolamine ethylene bis glycollate was substituted for the glycerin of the control. The effect upon the setting time attributable to the use of the triisopropanolamine salt is illustrated below

|  | Setting Time in Minutes at relative Humidities of— | |
|---|---|---|
|  | 25% | 50% |
| Control Glue | 5.0 | 9.0 |
| Test Glue | 2.0 | 5.0 |

It will be noted that the substitution of the alkanolamine salt for the glycerin of the control resulted in approximately a 50% reduction in setting time.

It is obvious to one skilled in the art that any animal glue or gelatin, whether derived from hide or bone stock, can be modified according to this invention. It is further obvious that there are numerous other preservatives, pigments, defoaming agents, and plasticizers that can be included in the above formulae without deviating from this invention in any way.

In determining the setting time for any given formulation, there is first prepared a glue solution of usable consistency. In a room of 78° F. and 50% relative humidity, this glue is then spread upon a sheet of good quality bond paper by means of a Bird applicator to form a wet film of the glue 0.0015 inch thick. One-half inch strips of the same paper are then applied across the glue film at regular intervals of 15 seconds during the time in which setting of the glue is taking place. After the last strip has been applied, the assembly is left undisturbed for 15 minutes. At the end of that time, strips are removed, starting from the first and proceeding until a strip is encountered which is easily removed with no fiber tear. The setting time is that time elapsing from the time of application of the glue film to the time of applying that strip of paper which could be removed without fiber tear.

When animal glue compositions containing the herein-disclosed compositions were tested in accordance with the foregoing procedure, it was found that the setting time of a film of the glue could be controlled by varying the concentrations of the herein-disclosed salts in the glue composition. For example, when mono, di and triethanolamine citrate, tartrates, or malates, or mono, di, and triisopropanolamine citrate, tartrates or malates are added to the flexible glue compositions shown in Example III, the setting time thereof was altered in the following manner:

| Concentration of the Alkylolamine Salt | Setting Time, Minutes |
|---|---|
| Flexible glue control sample | 8 |
| 1% concentration | 6 |
| 3% concentration | 3½ |
| 5% concentration | 1½ to 2 |

The alkylolamine salts of citric, tartaric, malic, and other hydroxy polycarboxylic acids exhibit this same general tendency to approximately the same degree so that it is practical to make use of any possible combination of the amine salts in order to take advantage of cost, availability and other economic factors. It is obvious that setting times can be regulated along with the degree of flexibility desired through the interchangeability of these alkylolamine salts with other plasticizers such as glycerine and sorbitol.

The setting time of a film of glue containing a substituted ammonium salt of the ether acids of the invention may be controlled to a considerable extent by varying the concentration of the substituted salt in the glue composition. The following table contains information illustrating the effect of varying the concentration of a diethanolamine ethylene bis glycollate in the flexible glue composition shown in Example III.

| Concentration of the Alkylolamine Salt | Setting Time, Minutes |
|---|---|
| Flexible Glue Control | 9 |
| 2% Concentration | 8 |
| 3% Concentration | 7 |
| 6% Concentration | 5 |
| 8% Concentration | 3 |

The present invention is not restricted in its applicability to any particular animal glue or gelatin composition or flexible glue composition but may be applied to any animal glue or gelatin compositions where it is desirable to reduce the time required for the film to become non-tacky. Thus, flexible glue compositions consisting of ani-animal glue or gelatin compositions where it is desirable such as glycerine sorbitol, glucose, invert syrup, and sugar or the like, are capable of having their setting time reduced by combining therewith the herein-disclosed salts. These flexible glue compositions may also contain a preservative, a moldicide and a defoaming agent to reduce the tendency of the glue solution to foam upon agitation. Also, a whitening agent such as titanium dioxide, lithopone, or china clay may be combined in the flexible glue composition. Any of the foregoing additives may be used in the flexible glue composition without interfering with the effective action of the herein-disclosed salts.

The precise concentration of the substituted ammonium salts of this invention may vary considerably as described herein. For example, the concentration may be varied to produce a glue composition having a particular setting time required in a particular gluing operation. Thus, in some applications, such as in the bookbinding art where it is desirable to have the glue film set as rapidly as possible, it would be desirable to use between 5 and 10 percent by weight of a salt such as diethanolamine citrate in the regular flexible glue composition. In applications where it is not so important to have the glue film become non-tacky in a very short time, a smaller concentration of 3 percent or less might be satisfactory. It should thus be apparent to those skilled in the art that the present invention makes it possible to adjust the setting time of animal glue compositions within a wide range and thereby makes the animal glue composition more adaptable to a variety of operations than has heretofore been possible. It is also obvious that by these salts we mean neutral salts or those containing no more free acid or alkali than can be tolerated by the adhesive composition. It is thus possible to substantially reduce the operating costs and increase the utility of animal glue composition by employing the present invention.

It should be evident from the foregoing examples and data that the substituted ammonium salts of the hydroxy and ether polycarboxylic acids and the alkylolamine salts of citric malic and tartaric acids in particular are extremely effective in reducing the setting time of animal glue and gelatin compositions and produce improved non-tacky films. The commercial applications of this invention are diverse and of great importance. Some but not all of the major fields of use for glue and gelatin wherein improvements can be effected by employing this invention are as a seam cement for sealing such metal containers as oil cans and the like, a plasticized glue or gelatin for use in the very flexible hectograph films or duplicator rolls, a furniture joint adhesive where fast set and prevention of embrittlement are desired, an adhesive in high speed bookbinding operations, and as an antiblocking and anticrazing agent for gummed paper, tape, and the like.

Obviously, many modifications and variations of the invention as hereinbefore set forth may be made without departing from the spirit and scope thereof and therefore only such limitations should be imposed as are indicated in the appended claims.

We claim:

1. A relatively fast setting, gel forming composition of the class of glue and gelatin, comprising a mixture of mainly an animal protein derived from collagen normally tending to have a slow set, and a substituted ammonium salt of a water soluble polycarboxylic acid whose acid portion is characterized by an additional function selected from the group consisting of alcohols and ethers within the range of about 1 to 10% by weight of the total composition as a set accelerating agent to improve the setting rate of said animal protein.

2. The composition according to claim 1 wherein the polycarboxylic acid is a polycarboxylic hydroxy acid.

3. The composition according to claim 1 wherein the ammonium salt is a hydroxy alkyl amine salt.

4. The composition according to claim 3 wherein the hydroxy alkyl amine salt is diethanolamine diglycollate.

5. The composition according to claim 3 wherein the hydroxy amine salt is diethanolamine ethylene bis glycollate.

6. The composition according to claim 3 wherein the hydroxy amine salt is tri-isopropylamine ethylene bis glycollate.

7. A relatively fast setting animal glue composition capable of setting to a tough, flexible adhesive comprising a mixture of mainly animal glue normally tending to have a slow set, and a hydroxy alkylamine salt of a water soluble polycarboxylic hydroxy organic acid within the range of about 1 to 10% of the total composition as a set accelerating agent.

8. A flexible glue composition according to claim 7 wherein the water soluble polycarboxylic hydroxy organic acid is selected from the group consisting of tartronic, malic, citramalic, hydroxy glutaric, tartaric, citric, trihydroxy glutaric, mannosaccharic, saccharic, and mucic.

9. A relatively fast setting, flexible animal glue adhesive comprising mainly an animal glue normally tending to be slow setting, and an animal glue plasticizing agent and an alkylolamine salt of a water soluble polycarboxylic hydroxy organic acid within the range of about 1 to 10% of the total composition as a set accelerating agent.

10. The method of improving the setting rate of animal glue, normally tending to be relatively slow setting, which comprises adding to said animal glue an alkylolamine salt of a water soluble polycarboxylic hydroxy organic acid within the range of about 1 to 10% of the total composition as a set accelerating agent, whereby the setting rate of said animal glue is substantially improved.

References Cited in the file of this patent

UNITED STATES PATENTS

| | | |
|---|---|---|
| 2,146,873 | Wilmanns | Feb. 14, 1939 |
| 2,389,605 | Atwood | Nov. 27, 1945 |
| 2,411,989 | Dunham | Dec. 3, 1946 |
| 2,436,181 | Rosser | Feb. 17, 1948 |
| 2,616,812 | Kramsky | Nov. 4, 1952 |

UNITED STATES PATENT OFFICE
CERTIFICATE OF CORRECTION

August 11, 1959

Patent No. 2,899,327

Edward F. Christopher et al.

It is hereby certified that error appears in the printed specification of the above numbered patent requiring correction and that the said Letters Patent should read as corrected below.

Column 3, line 15, for "160° G." read -- 160° F. --; line 46, for "usuable" read -- usable --; column 4, line 48, for "260 gm." read -- 250 gm. --; line 59, for "usuable" read -- usable --; column 6, lines 48 and 49, strike out "ani-animal glue or gelatin compositions where it is desirable" and insert instead -- animal glue solutions, plasticized with water-soluble reagents --.

Signed and sealed this 16th day of February 1960.

(SEAL)
Attest:

KARL H. AXLINE
Attesting Officer

ROBERT C. WATSON
Commissioner of Patents